(12) United States Patent
Tseng

(10) Patent No.: US 6,782,451 B2
(45) Date of Patent: Aug. 24, 2004

(54) CONTROL CIRCUIT TO ALLOW THE USE OF AN UNBUFFERED DIMM IN A SYSTEM WITH A REGISTERED-DIMM-ONLY CHIPSET

(75) Inventor: Jen-Ming Tseng, Tainan (TW)

(73) Assignee: Asustek Computer Inc., Taipei (TW)

( * ) Notice: Subject to any disclaimer, the term of this patent is extended or adjusted under 35 U.S.C. 154(b) by 162 days.

(21) Appl. No.: 09/911,500

(22) Filed: Jul. 25, 2001

(65) Prior Publication Data

US 2002/0032836 A1 Mar. 14, 2002

(30) Foreign Application Priority Data

Aug. 3, 2000 (TW) ........................................ 89115648 A

(51) Int. Cl.[7] ............................................ G06F 12/00
(52) U.S. Cl. .......................... 711/115; 711/105; 711/5; 365/185.11; 365/230.02; 365/230.03; 365/230.08
(58) Field of Search ............................ 711/5, 105, 115; 365/185.11, 52, 189.05, 230.02, 230.03, 230.08

(56) References Cited

U.S. PATENT DOCUMENTS

| | | | | |
|---|---|---|---|---|
| 6,092,146 A | * | 7/2000 | Dell et al. ..................... | 711/5 |
| 6,097,883 A | * | 8/2000 | Dell et al. ..................... | 710/301 |
| 6,173,382 B1 | * | 1/2001 | Dell et al. ..................... | 711/170 |
| 6,209,074 B1 | * | 3/2001 | Dell et al. ..................... | 711/170 |
| 6,226,729 B1 | * | 5/2001 | Stevens et al. .............. | 711/171 |
| 6,253,278 B1 | * | 6/2001 | Ryan ........................... | 711/105 |
| 6,330,637 B1 | * | 12/2001 | Ryan ........................... | 711/105 |
| 6,446,158 B1 | * | 9/2002 | Karabatsos ................... | 711/5 |

* cited by examiner

Primary Examiner—Jack A. Lane
Assistant Examiner—Jasmine Song
(74) Attorney, Agent, or Firm—Rabin & Berdo, P.C.

(57) ABSTRACT

A control circuit to allow the use of an unbuffered DIMM in a system with a registered-DIMM-only chipset. The control circuit is for receiving an address signal and control signal outputted from the registered-DIMM-only chipset. Then, according to the DIMM installed into a memory module socket, the control circuit controls a transmitting module or buffering module to selectively output the address signal and control signal of the DIMM to the memory module socket. In a system with a registered-DIMM-only chipset, users can selectively use a registered DIMM or an unbuffered DIMM installed in the memory module socket according to actual condition.

9 Claims, 3 Drawing Sheets

CONTROL CIRCUIT TO ALLOW THE USE OF AN UNBUFFERED DIMM IN A SYSTEM WITH A REGISTERED-DIMM-ONLY CHIPSET

BACKGROUND OF THE INVENTION

This application incorporates by reference Taiwanese application Ser. No. 89115648, filed Aug. 3, 2000.

1. Field of the Invention

The invention relates in general to a control circuit for connecting a chipset and a Dual In-line Memory Module (DIMM), and more particularly to a control circuit to allow the use of an unbuffered DIMM in a system with a registered-DIMM-only chipset.

2. Description of the Related Art

In the personal workstation or server of a modern computer system, the main memory of the computer system generally uses memory modules with standard industrial architecture. These memory modules generally include a plurality of dynamic random access memory (DRAM) chipsets which are mounted on a small circuit board and the small circuit board is connected to a memory module socket electrically. Lately, standard industrial architecture of memory modules includes Single In-line Memory Modules (SIMMs) and DIMMs. A SIMM has memory units mounted on one side of a circuit board while a DIMM has memory units mounted on both sides of a circuit board. Nowadays, a personal computer mostly uses an unbuffered DIMM if a DIMM is selected as the main memory. However, for a computer system with higher main memory volume requirements (i.e. a server), the unregistered DIMMs are the popular choice.

In a system with a registered-DIMM-only chipset, only registered DIMMs are supported. If an unbuffered DIMM is installed in a memory module socket of the system, registered-DIMM-only chipset, it will not function normally because of differences in timing between the unbuffered and registered DIMM. Accordingly, use and selection of memory modules is not very flexible. Moreover, cost of a registered DIMM is higher than an unbuffered DIMM. If the above server system can use an unbuffered DIMM and satisfy system requirements, a reduction in the cost of the system can be realized.

SUMMARY OF THE INVENTION

It is therefore an object of the invention to provide a control circuit for a user to not only use a registered DIMM but also an unbuffered DIMM in a system with a registered-DIMM-only chipset. In this way, the user can selectively use either a registered or an unbuffered DIMM according to actual condition. The invention can also contribute to reduce the cost of the system.

The invention achieves the above-identified objects by providing a control circuit to allow the use of an unbuffered dual in-line memory module (DIMM) in a system with a registered-DIMM-only chipset. The control circuit is for receiving a first address signal and first control signal outputted from the registered-DIMM-only chipset and receiving a recognizing signal for recognizing a DIMM, wherein the DIMM is installed into a memory module socket. The control circuit includes a buffering module and transmitting module. The buffering module is for receiving the first address signal and first control signal and then outputting a second address signal and second control signal to an address bus and a control bus which are electrically connected to the memory module socket. The buffering module further includes registers, a clock buffer and a control input terminal, which is for receiving the recognizing signal. The transmitting module is for receiving the first address signal and first control signal. The transmitting module further receives the recognizing signal to determine whether to output the first address signal and the first control signal to the address bus and control bus.

Wherein, when the installed DIMM is a registered DIMM, the recognizing signal triggers the transmitting module to output the first address signal and first control signal to the memory module socket. When the installed DIMM is an unbuffered DIMM, the recognizing signal triggers the buffering module to output the second address signal and second control signal to the memory module socket.

BRIEF DESCRIPTION OF THE DRAWINGS

Other objects, features, and advantages of the invention will become apparent from the following detailed description of the preferred but non-limiting embodiments. The description is made with reference to the accompanying drawings, in which.

DESCRIPTION OF THE PREFERRED EMBODIMENT

Figure 1:
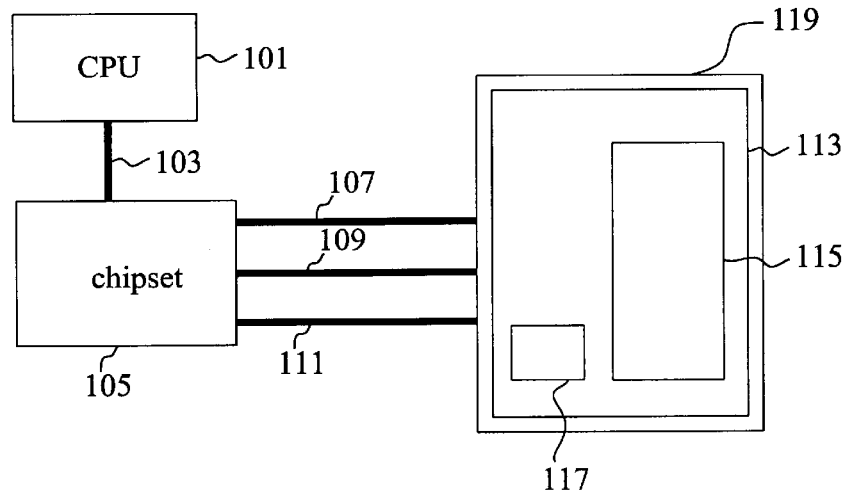
FIG. 1 (Prior Art) is a structural block diagram of connection between a central process unit (CPU) and an unbuffered Dual In-line Memory Module (DIMM) in a general computer system.

Referring to FIG. 1, it shows the structural block diagram of connection between a central process unit (CPU) and an unbuffered Dual In-line Memory Module (DIMM) in a general computer system. As shown in FIG. 1, an unbuffered DIMM 113 includes a synchronous dynamic random access memory (SDRAM) module 115 and a serial presence detect (SPD) memory 117. The SPD memory 117 is for storing related setting of the unbuffered DIMM 113 which includes timing of the SDRAM module 115.

When the computer system starts, a basic input/output system (BIOS) (not shown in the diagram) recognizes that the main memory of the computer system is the unbuffered DIMM 113 from the SPD memory 117. A CPU 101 is electrically connected to a chipset 105 via a front side bus 103 and the chipset 105 is an unbuffered-DIMM-only chipset. The chipset 105 is electrically connected to a memory module socket 119 via an address bus 107, control bus 109, and a data bus 111. The unbuffered DIMM 113 is installed into the memory module socket 119.

Figure 2:
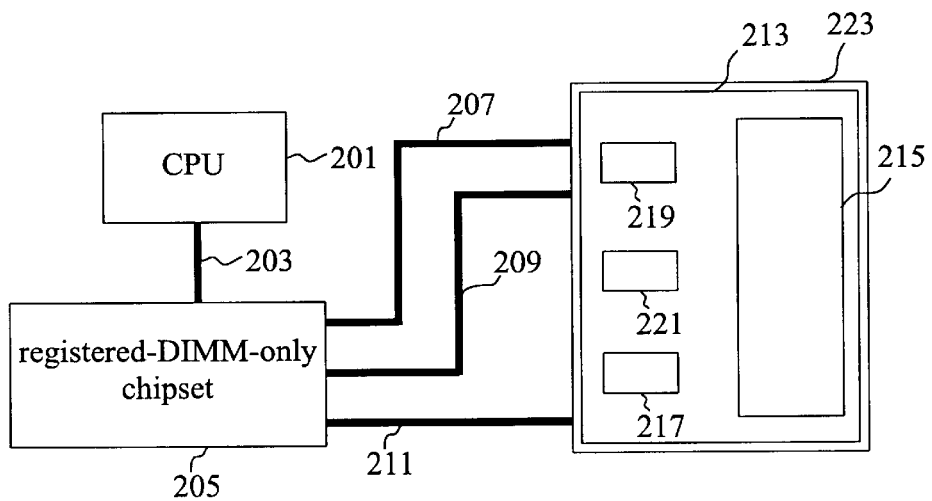
FIG. 2 (Prior Art) is a structural block diagram of connection between a CPU and a registered DIMM in a general computer system.

Referring to FIG. 2, it shows the structural block diagram of connection between a CPU and a registered DIMM in a general computer system. As shown in FIG. 2, a registered DIMM 213 includes a SDRAM module 215, SPD memory 217, registers 219, and a clock buffer 221. The SPD memory 217 is for storing related settings of the registered DIMM 213 which includes timing of the SDRAM module 215.

When the computer system starts, a BIOS (not shown in the diagram) recognizes that the main memory of the computer system uses the registered DIMM 213 from the SPD memory 117 and the registers 219 and clock buffer 221 are for driving and amplifying input and output signals of the SDRAM 215. The CPU 201 is electrically connected to a registered-DIMM-only chipset 205 via a front side bus 203. The chipset 205 is electrically connected to a memory module socket 223 via an address bus 207, control bus 209 and data bus 211. The registered DIMM 213 is installed into the memory module socket 223. Wherein, signals transmitted by the data bus 211 are received by the SDRAM 215. After the registers 219 and clock buffer 221 drive and amplify an address signal and a control signal respectively transmitted by the address bus 207 and control bus 209, the address signal and control signal are received by the SDRAM 215.

In the above system with the registered-DIMM-only chipset 205, only the registered DIMM 215 is supported. If an unbuffered DIMM is installed into the memory module socket 223, the system cannot function normally because of different timing between the chipset 205 and the unbuffered DIMM. The invention provides a control circuit for a user to be able to selectively use a registered DIMM or an unbuffered DIMM in a system with a registered-DIMM-only chipset.

First Preferred Embodiment

Figure 3:
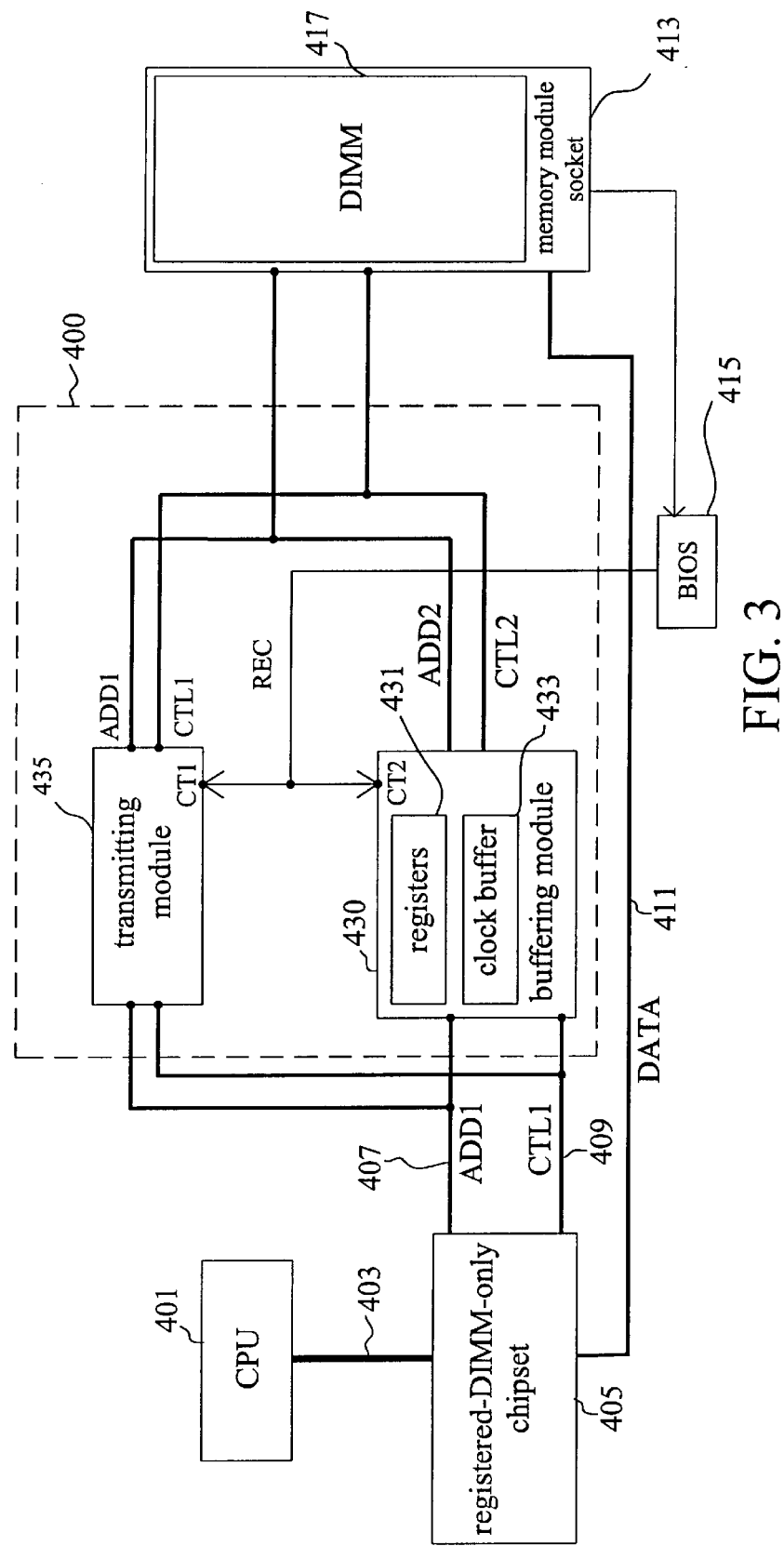
FIG. 3 is a structural block diagram of the control circuit to allow the use of an unbuffered DIMM in a system with a registered-DIMM-only chipset according to one example of a preferred embodiment of the invention.

Referring to FIG. 3, it shows the structural block diagram of the control circuit 400 to allow the use of an unbuffered DIMM in a system with a registered-DIMM-only chipset according to a preferred embodiment of the invention. As shown in FIG. 3, a memory module socket 413 is the location where a Dual In-line Memory Module (DIMM) 417 is installed into the main board of the system. The DIMM 417 can be a registered DIMM or an unbuffered DIMM. A central process unit (CPU) 401 is electrically connected to a registered-DIMM-only chipset 405 via a front side bus 403. The chipset 405 outputs a first address signal ADD1, first control signal CTL1, and data signal DATA respectively via an address bus 407, a control bus 409, and data bus 411. The registered-DIMM-only chipset 405 is electrically connected to the memory module socket 413 also via the data bus 411. As a result, the data signal DATA can be directly received by the memory module socket 413.

The control circuit 400 of the invention includes a transmitting module 435 and a buffering module 430. The transmitting module 435 directly receives the first address signal ADD1 and first control signal CTL1 and can determine whether to open a channel for outputting the signals ADD1 and CTL1. The first address signal ADD1 and first control signal CTL1 can also be received by the buffering module 430 for temporary storage. The buffering module 430 outputs a second address signal ADD2 and second control signal CTL2. The buffering module 430 includes registers 431 and a clock buffer 433. The transmitting module 435 and buffering module 430 respectively include a control input terminal CT1 and CT2 for receiving a recognizing signal REC from a basic input output system (BIOS) 415. Under the control of the recognizing signal REC, the transmitting module 435 and buffering module 433 can selectively determine to output the first group of input signals, ADD1 and CTL1, or the second group of input signals, ADD2 and CTL2, to the memory module socket. Detailed operations are described as follows.

The BIOS 415 is electrically connected to the control input terminal CT1 of the transmitting module 435 and the control input terminal CT2 of the buffering module 430. When the system starts, the BIOS 415 recognizes that the DIMM 417 is an unbuffered DIMM or a registered DIMM by reading also from a SPD memory (not shown in the diagram) of the DIMM 417 installed into the memory module socket 413. The BIOS 415 then outputs the recognizing signal REC to the control input terminal CT1 of the transmitting module 435 and the control input terminal CT2 of the buffering module 430. According to the recognizing signal REC, the transmitting module 435 and buffering module 430 then determine which outputting signals are suitable for the installed DIMM 417.

As a result, if the installed DIMM 417 is a registered DIMM, the transmitting module 435 is triggered to output the first address signal ADD1 and first control signal CTL1 to the memory module socket 413. If the installed DIMM 417 is an unbuffered DIMM, the buffering module 430 is opened to output the second address signal ADD2 and second control signal CTL2, which are registered and buffered, to the memory module socket 413. Thus, even if an unbuffered DIMM is installed in the system, the clock can be synchronous with that of the registered-DIMM-only chipset 405 and the system still functions normally. Accordingly, the system with a registered-DIMM-only chipset 405 can selectively use a registered DIMM or an unbuffered DIMM.

Second Preferred Embodiment

Figure 4:
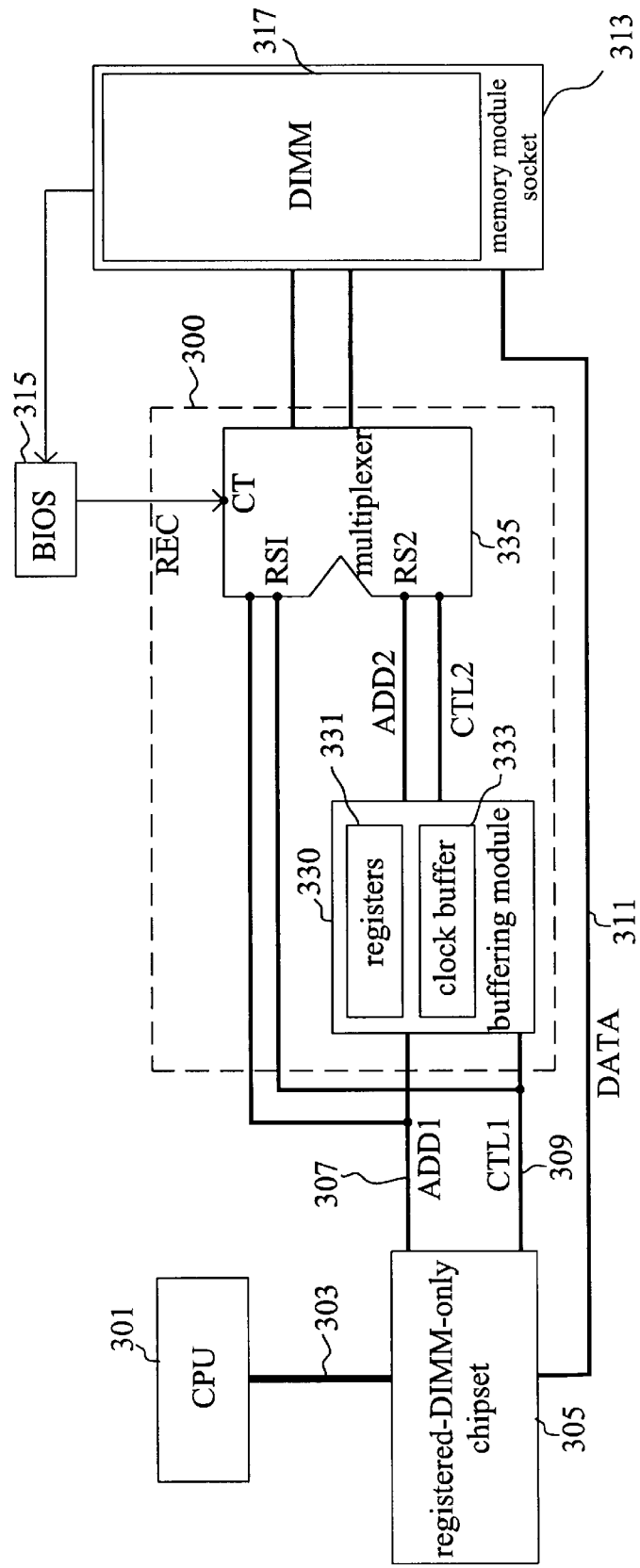
FIG. 4 is a structural block diagram of the control circuit to allow the use of an unbuffered DIMM in a system with a registered-DIMM-only chipset according to a second example of a preferred embodiment of the invention.

Referring to FIG. 4, it shows the structural block diagram of the control circuit 300 to allow the use of an unbuffered DIMM in a system with a registered-DIMM-only chipset according to a preferred embodiment of the invention. As shown in FIG. 4, a memory module socket 313 is the location where a Dual In-line Memory Module (DIMM) 317 is installed into the main board of the system. The DIMM 317 can be a registered DIMM or an unbuffered DIMM. A central process unit (CPU) 301 is electrically connected to a registered-DIMM-only chipset 305 via a front side bus 303. The registered-DIMM-only chipset 305 outputs a first address signal ADD1, first control signal CTL1, and data signal DATA respectively via an address bus 307, a control bus 309, and data bus 311. The registered-DIMM-only chipset 305 is electrically connected to the memory module socket 313 via the data bus 311. As a result, the data signal DATA can be directly received by the memory module socket 313.

The control circuit of the invention includes a multiplexer 335 and a buffering module 330 which includes registers 331 and a clock buffer 333. The first address signal ADD1 and first control signal CTL1, collectively called the first group of input signals, can be directly received by a first input terminal RS1 of the multiplexer 335. The buffering module 330 receives the first group of input signals and outputs a second address signal ADD2 and second control signal CTL2 collectively termed the second group of input signals. The second group of input signals are received by a second input terminal RS2 of the multiplexer 335.

In addition, a control input terminal CT of the multiplexer 335 receives a recognizing signal REC outputted from a basic input output system (BIOS) 315. Under the control of the recognizing signal REC, the multiplexer 335 can selectively determine to output the first group of input signals, ADD1 and CTL1, or the second group of input signals, ADD2 and CTL2, to the memory module socket 313 as detailed below.

The BIOS 315 is electrically connected to the control input terminal CT of the multiplexer 335. When the system starts, the BIOS 415 recognizes whether the DIMM 317 is an unbuffered or a registered DIMM by reading also from a SPD memory (not shown in the diagram) of the DIMM 317 installed into the memory module socket 313. The BIOS 315 then outputs the recognizing signal REC to the control input terminal CT of the multiplexer 335. According to the recognizing signal REC, the multiplexer 335 then determines which output signals are suitable for the installed DIMM 317.

As a result, if the installed DIMM 317 is a registered DIMM, the multiplexer 335 outputs the first group of input signals ADD1 and CTL1 to the memory module socket 313. However, if the installed DIMM 317 is an unbuffered DIMM, the multiplexer 335 outputs the second group of input signals to the memory module socket 313. Thus, even if an unbuffered DIMM is installed into the system, the clock can be synchronous with the clock of the registered-DIMM-only chipset 305 and the system still function normally. Accordingly, the control circuit of the invention, the system with a registered-DIMM-only chipset 305 can selectively use a registered DIMM or an unbuffered DIMM.

In embodiments one and two of the invention, a transmitting module and multiplexer are respectively used to select one of the first address signal and the first control signal or the second address signal and the second control signal to output. In practice, the system is not restricted to the multiplexer or transmitting module. Any control circuit or control module, which can achieve the said functions of selective output, can be applied in the system of the invention.

An advantage of the control circuit to allow the use of an unbuffered DIMM in a system with a registered-DIMM-only chipset of the above embodiment is that the user is empowered to choose a registered DIMM or an unbuffered DIMM as deemed necessary.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A control circuit for use with a computer system, the computer system having a registered-dual in-line memory module-only (registered-DIMM-only) chipset and a memory module socket for installing therein a socket-installed DIMM, the control circuit for receiving a first address signal and first control signal outputted from the registered-DIMM-only chipset, the control circuit having means for receiving a recognizing signal for recognizing a the socket-installed-DIMM, the control circuit being external to the socket-installed DIMM, the control circuit comprising:

a buffering module for receiving the first address signal and first control signal, the buffering module comprising a first control input terminal for receiving the recognizing signal to output a second address signal and second control signal to the memory module socket if recognizing the DIMM in the memory module socket is not the an unbuffered DIMM; and a transmitting module for receiving the first address signal and first control signal, the transmitting module comprising a second control input terminal for receiving the recognizing signal to output the first address signal and first control signal to the memory module socket if recognizing the DIMM is the unbuffered DIMM.

2. The control circuit according to claim 1, wherein the buffering module further comprises registers and a clock buffer for generating the second address signal and the second control signal from the first address signal and the first control signal.

3. The control circuit according to claim 1, wherein the registered-DIMM-only chipset further outputs a data signal directly to the memory module socket via a data bus.

4. The control circuit according to claim 1, wherein the recognizing signal is outputted from a basic input output system (BIOS) of the computer system.

5. A control circuit for use with a computer system, the computer system having a registered-dual in-line memory module-only (registered-DIMM-Only) chipset and a memory module socket for installing therein a socket-installed DIMM, the control circuit for receiving a first address signal and first control signal outputted from the registered-DIMM-only chipset, the control circuit having means for receiving a recognizing signal for recognizing a the socket-installed-DIMM, the control circuit being external to the socket-installed DIMM, the control circuit comprising:

a buffering module for receiving the first address signal and first control signal and outputting a second address signal and second control signal, wherein the buffering module comprises registers and a clock buffer for generating the second address signal and the second control signal from the first address signal and the first control signal; and a control module comprising a first input terminal for receiving the first address signal and first control signal, a second input terminal for receiving the second address signal and second control signal, and a control input terminal for receiving the recognizing signal, the control module, alternatively according to the recognizing signal, outputting the first address signal and first control signal to the memory module socket if recognizing the DIMM is the unbuffered DIMM, or outputting the second address signal and second control signal to the memory module socket if recognizing the DIMM is not the unbuffered DIMM.

6. The control circuit according to claim 5, wherein the registered-DJMM-only chipset further outputs a data signal directly to the memory module socket via a data bus.

7. The control circuit according to claim 5, wherein the recognizing signal is outputted from a basic input output system (BIOS) of the computer system.

8. The control circuit according to claim 5, wherein the control module is a multiplexer.

9. In a computer system with a registered-DIMM-only chipset, a control circuit located outside a dual in-line memory module (DIMM) for receiving a first operation signal outputted from the chipset and a recognizing signal for recognizing the DIMM installed in a memory module socket of the computer system, the control circuit comprising:

a buffering module for receiving the first operation signal and outputting a second operation signal;

wherein according to the recognizing signal, the control circuit alternatively determines to output the first operation signal or the second operation signal to the memory module socket, wherein the control circuit further comprises a control module comprising a first input terminal for receiving the first operation signal, a second input terminal for receiving the second operation signal, and a control input terminal for receiving the recognizing signal, the control module alternatively determines to output the first operation signal and the second operation signal to the memory module socket according to the recognizing signal, wherein the control module comprises a multiplexer, wherein the control module outputs the first operation signal to the memory module socket when recognizing the DIMM is a registered DIMM by the recognizing signal, wherein the control module outputs the second operation signal to the memory module socket when recognizing the DIMM is an unbuffered DIMM by the recognizing signal, wherein the control circuit further comprises a transmitting module for receiving the first operation signal, and the transmitting module further comprises a first control input terminal for receiving the recognizing signal to output the first operation signal to the memory module socket if recognizing the DIMM is an unbuffered DIMM, wherein the buffering module further comprises a second control input terminal for receiving the recognizing signal to output a second operation signal to the memory module socket if recognizing the DIMM is a registered DIMM.

* * * * *